United States Patent [19]

Li et al.

[11] Patent Number: 5,349,039
[45] Date of Patent: Sep. 20, 1994

[54] SOLUBLE POLYESTERIMIDE

[75] Inventors: Chien-Hui Li, Hsinchu; Tzong-Ming Lee, Tainan; Jyh-Chien Chen, Chayi, all of Taiwan

[73] Assignee: Industrial Technology Research Institute, Chutung, Japan

[21] Appl. No.: 963,464

[22] Filed: Oct. 20, 1992

[51] Int. Cl.$^5$ .............................................. C08G 73/10
[52] U.S. Cl. ................................. 528/170; 528/125; 528/126; 528/128; 528/171; 528/173; 528/313; 528/314; 528/315; 528/321; 528/322
[58] Field of Search ............ 528/170, 125, 126, 128, 528/171, 173, 313, 314, 315, 321, 322

[56] References Cited

U.S. PATENT DOCUMENTS

| | | | |
|---|---|---|---|
| 3,567,685 | 3/1971 | Bialous et al. | 528/170 |
| 4,176,223 | 11/1979 | Irwin | 528/170 |
| 4,801,676 | 1/1989 | Hisgen et al. | 528/170 |
| 4,923,953 | 5/1990 | Neugebauer et al. | 528/170 |
| 5,147,962 | 9/1992 | Tanisake et al. | 528/170 |

*Primary Examiner*—John Kight, III
*Assistant Examiner*—P. Hampton Hightower
*Attorney, Agent, or Firm*—Marshall & Melhorn

[57] ABSTRACT

Disclosed is a polyester-imide prepared from a condensation polymerization of aromatic diacid, diimide diacid, and diol, having a carboxy to hydroxy equivalent molar ratio of 0.9:1 to 1.1:1. The disclosed polyester-imide has outstanding heat-resistance, remarkable filming ability, and high solubility in both phenol series and amide series solvents.

8 Claims, No Drawings

SOLUBLE POLYESTERIMIDE

BACKGROUND OF THE INVENTION

The present invention relates to a novel polyesterimide which is soluble in both phenol series and amide series solvent, and the preparation of the same.

Polyimide is a known polymer with outstanding heat stability and mechanical property. But it is not available for application in solution processing because it is insoluble in general organic solvents. Conventional preparation of polyimide utilizes the precursor polyamic acid for processing, followed by cyclization. However, due to difficulties in storage and the strong corrosive property of polyamic acid, handling and processing are problematic.

In order to improve the processing ability but retain the heat stability of polyimide, polyester-imides are prepared by introducing an ester group into the main chain of the polymer. However, it is necessary to use the phenol series, such as m-cresol and cresylic acid, as the solvent of conventional polyester-imide. As to the solvent of amide series, e.g., N-methyl-2-pyrrolidone (NMP), N,N'-dimethylformamide (DMF), and N,N'-dimethylacetamide (DMAC), the solubility of polyester-imide is poor. Additionally, the strong odor and the corrosive damage to skin make a phenol series solvent inappropriate for polyester-imide processing.

SUMMARY OF THE INVENTION

Accordingly, an object of the present invention is to provide a polyester-imide having good heat stability, filming ability, and high solubility in both the phenol series and amide series solvents.

DETAILED DESCRIPTION OF THE INVENTION

The above object can be attained by providing a polyester-imide of the present invention which has been made with the following three ingredients:

(a) An aromatic diacid mixture of terephthalic acid (TPA) and isophthalic acid (IPA) having a mixing ratio of 1:0 to 0:1 and comprising 0–49 molar percent of the total ingredients, (b) Diimide diacid(DID) having the formula shown as following:

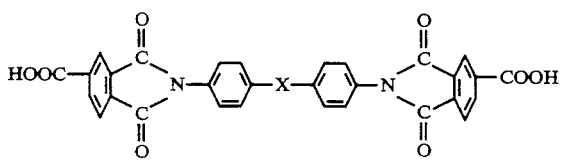

wherein
X=O, S, SO$_2$, CO, or CH$_2$;

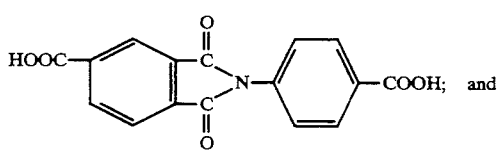

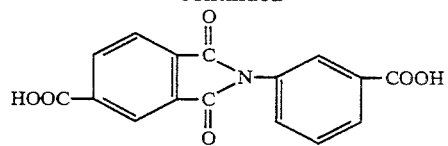

and comprising 1–50 molar percent of the total ingredients, (c) Aryl diol $c_1$ or $c_2$, comprising 50 molar percent of the total ingredients, wherein $C_1$ has the formula shown as below:

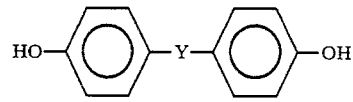

wherein
Y=C(CH$_3$)$_2$, SO$_2$, or S; and $c_2$ is a mixture of hydroquinone (HQ) and resorcinol (RC) with a mixing ratio of 1:0 to 1:1.

According to the present invention, the molar ratio between diacids ((a) & (b)) and diol ($c_1$ or $c_2$) is 0.9:1 to 1.1:1.

The polymerization method of the polyester-imide of the present invention can be direct condensation, solution, and hot melt polymerization, which are all familiar to those skilled in this art.

When direct condensation polymerization is used in the present invention, the condensing agent can be diphenyl chlorophosphate, thionyl chloride(SOCl$_2$), or tosyl chloride, the solvent can be pyridine or DMF, and lithium chloride or calcium chloride is added as condensing coagent.

When solution polymerization is used in the present invention, diols are added to acid chloride, which is the chlorination product of the diacids, and pyridine or triethyl amine is used as a deacidizing agent.

When hot melt polymerization is used, the derivatives of esterification of diols are mixed with diacids as the reactants, or alternatively a mixture of diols, diacids, and acetic anhydride is used as reactant. Both will result in same polymer product of the present invention. In this polymerization, tetrabutyl titanate, isopropyl titanate, or zinc acetate are added as a catalyst.

This invention will be more clearly understood by referring to the following illustrative examples.

EXAMPLE 1

Trimellitic anhydride (TMA) of 57.6 g, p-aminobenzoic acid of 41.1 g, and DMF of 400 ml were mixed and mechanically stirred at 120° C. for 2 hours. After cooling, 0.4 mole of acetic anhydride was added. The mixture was reheated to 120° C. for 2 hours, then poured into ice water, filtered. N-(p-carboxyphenyl)trimellitimide (DID M$_1$) was obtained after and drying under vacuum at 80° C. overnight.

EXAMPLE 2

The same procedure as described in Example 1 was employed, except TMA of 80.7 g, m-aminobenzoic acid of 57.6 g, and 0.42 mole of acetic anhydride were used in place of the corresponding reagent, respectively. N-(m-carboxyphenyl)trimellitimide ( DID M$_2$) was obtained.

EXAMPLE 3

0.2 mole of TMA, 0.1 mole of 4,4'-diaminodiphenyl ether, and 400 ml of DMF were mixed and circulated for 4 hrs. After cooling, methanol was poured into the solution for precipitation, followed by filtration and drying under vacuum at 80° C. overnight. Oxy-bis(N-(4-phenylene)-4'-(carboxylic acid)-phthalimide) (DID $M_3$) was obtained.

EXAMPLE 4

A solution was prepared by mixing 3.4923 g (13 mmol) of diphenyl chlorophosphate, 10 ml of pyridine, 2.5 mmol of DID $M_2$, and 2.5 mmol of IPA, at room temperature, under nitrogen, and this solution was stirred for 20 minutes. Subsequently, this solution was poured into a mixed solution of 0.4239 g of lithium chloride dissolved in 10 ml of pyridine, and was stirred for 30 min. The resulting solution was heated to 120° C., followed by further stirring for 20 minutes to finish the dissolution. Another solution prepared from 5 mmol of bisphenol (5 mmol) and 10 ml of pyridine was added dropwise to the reactant solution during a period of 25 minutes. The reaction was carried out at 120° C. for 3 hrs. After pouring the reaction solution into a glass of water under stirring, followed by washing with boiling methanol for 1 hour and dried in a vacuum oven at 80° C., the polyester-imide of the present invention was obtained.

The polyester-imide thus produced was made into samples and tested. The testing method, testing instruments, and conditions for each sample are as follows:

$T_g$: Detector, Du Pont TMA 2940, under $N_2$ gas, temperature increase rate of 20° C./min;

$T_d$: Detector, Du Pont TGA 951, under $N_2$ gas, temperature increase rate of 10° C./min($T_d$ is defined as a characteristic temperature at which 5% of weight loss is detected);

Mechanical property: ASTM D638.

These tests show that the polyester-imide prepared has a $T_g$ of 192° C., a $T_d$ of 449° C., a stress strength of 7.70 kg/mm$^2$, and a strain of 8.97%.

EXAMPLES 5–22

The same procedure and test methods as described in Example 4 were employed except that different DID, Diacid and Diol and different molar ratio as indicated in Table 1 were used. The physical properties of the tested polyester-imide are shown in Table 1 and their solubility in NMP, DMF, DMSO, DMAC and m-cresol are shown in Table 2.

COMPARATIVE EXAMPLE 23

Samples made from ISOMID (Trademark, Nippon Shokubai Co. Ltd., a known commercial polyester-imide) were tested by the same methods as described in Example 4 and found that ISOMID has a $T_g$ of 182° C., a $T_d$ of 427° C., fair filming ability, and poor mechanical strength. The dry isomid film has poor solubility in NMP, DMAC, DMF, and m-cresol. The test results of this commercial available ISOMID are also shown in Table 1 and Table 2.

TABLE 1

Monomer Compositions and Physical Properties of Polyester-imide

| Example No. | DID Diacid Diol @ Molar ratio among (diacids and diol) | $\eta_{inh}$ (dl/g) | Property of film | $T_g$ (°C.) | $T_d$ (°C.) | Stress (6 kg/mm$^2$) | Strain (%) |
| --- | --- | --- | --- | --- | --- | --- | --- |
| 4 | $M_2$ IPA BPA (5:5:10) | 0.40 | flexible | 192(195*) | 449 | 7.70 | 8.97 |
| 5 | $M_1$ — BPA (5:10) | 0.39 | flexible | — | 418 | | |
| 6 | $M_1$ IPA BPA (5:5:10) | 0.30 | flexible | 198 | — | | |
| 7 | $M_2$ — BPA (5:10) | 0.42 | flexible | 217 | 465 | | |
| 8 | $M_2$ IPA BPA (7:3:10) | 0.41 | flexible | 193(210*) | 441 | 7.16 | 9.35 |
| 9 | $M_3$ IPA BPA (5:5:10) | 0.55 | flexible | 213(200*) | 474 | | |
| 10 | $M_3$ — BPA (5:10) | 0.40 | | — | 441 | | |
| 11 | $M_3$ IPA BPA (7:3:10) | 0.47 | flexible | 223 | 429 | 6.35 | 8.60 |
| 12 | $M_2$ TPA BPA (5:5:10) | 0.58 | flexible | 211 | — | | |
| 13 | $M_2$ IPA HQ/RC (5:5:5:5) | 0.45 | flexible | 177 | 422 | | |
| 14 | $M_2$ IPA HQ/RC (7:3:5:5) | 0.39 | flexible | | 420 | | |
| 15 | $M_2$ — HQ/RC (5:5:5) | 0.41 | | — | — | | |
| 16 | $M_1$ IPA HQ/RC (5:5:5:5) | — | | — | — | | |
| 17 | $M_1$ IPA HQ/RC (7:3:5:5) | — | | — | — | | |
| 18 | $M_3$ IPA HQ/RC (7:3:5:5) | — | | — | — | | |
| 19 | $M_3$ IPA HQ/RC (5:5:5:5) | — | | — | — | | |
| 20 | $M_2$ IPA HQ (5:5:10) | — | flexible | 200 | — | | |
| 21 | $M_3$ TPA BPA (5:5:10) | 0.58 | flexible | 206 | 462 | | |
| 22 | $M_3$ TPA BPA (7:3:10) | 0.50 | flexible | 215(214*) | 466 | | |

TABLE 1-continued

Monomer Compositions and Physical Properties of Polyester-imide

| Example No. | DID Diacid Diol @ Molar ratio among (diacids and diol) | $\eta_{inh}$ (dl/g) | Property of film | $T_g$ (°C.) | $T_d$ (°C.) | Stress (6 kg/mm²) | Strain (%) |
|---|---|---|---|---|---|---|---|
| 23 | (ISOMID) | | brittle | 182* | 427 | ** | |

@ Bisphenol A(BPA) or hydroquinone(HQ)/resorcinol(RC) mixture is employed.
*Under DSC testing: N₂ gas, heating rate = 20° C./min.
**Poor filming ability, can not be tested under stress.

TABLE 2

Solubility of Polyester-imide

| Example No. | NMP | DMF | DMSO | DMAC | m-Cresol |
|---|---|---|---|---|---|
| 4 | ++ | ++ | ++ | ++ | ++ |
| 5 | ++ | ++ | ++ | ++ | ++ |
| 6 | ++ | ++ | ++ | ++ | ++ |
| 7 | ++ | ++ | ++ | ++ | ++ |
| 8 | ++ | ++ | ++ | ++ | ++ |
| 9 | ++ | ++ | ++ | ++ | ++ |
| 10 | ++ | ++ | − | ± | ++ |
| 11 | ++ | ++ | ++ | ++ | ++ |
| 12 | ++ | ++ | | ++ | ++ |
| 13 | ++ | ++ | − | ++ | ++ |
| 14 | ++ | ++ | ± | ++ | ++ |
| 15 | + | | ± | | ++ |
| 16 | ± | | − | ± | ++ |
| 17 | ± | ± | − | + | ++ |
| 18 | ± | − | − | + | ++ |
| 19 | ± | − | − | | |
| 20 | ± | − | − | − | |
| 21 | ++ | ++ | − | ++ | ++ |
| 22 | ++ | ++ | | ++ | ++ |
| 23 (ISOMID) | − | − | − | − | − |

++: soluble at room temperature.
+: soluble during heating.
±: partially soluble during heating.
−: insoluble during heating.

In view of the above results, it is apparent that the polyester-imide of the present invention has good heat stability ($T_d > 420°$ C.), high $T_g$ (most of them >200° C.), good filming ability, flexibility, strong mechanical strength, and good solubility in NMP, DMF, DMAC, DMSO, and m-cresol.

What is claimed is:

1. An amide and phenol series solvents soluble polyester-imide, having a carboxy to hydroxy equivalent molar ratio of 0.9:1 to 1.1:1 produced from:
   (a) aromatic diacid selected from the group consisting of
      (a₁) terephthalic acid(TPA),
      (a₂) isophthalic acid(IPA), and
      mixture thereof, and having a ratio of TPA:EPA of 1:0 to 0:1 and comprising 0–49 molar percent of the total ingredients;
   (b) an imide diacid selected from the group consisting of
      (b₁) a diimide diacid having the formula as follows:

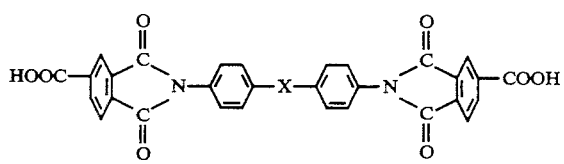

wherein x is selected from the group consisting of O, S, SO₂, CO, and CH₂,
      (b₂) a monoimide having the formula as follows:

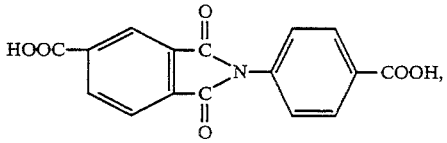

and
      (b₃) a monoimide having the formula as follows:

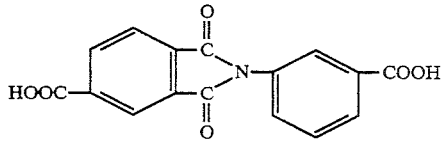

and mixtures thereof, and comprising 1–50 molar percent of the total ingredients; and
   (c) aryl diol selected from the group consisting of
      (c₁) having the formula as follows:

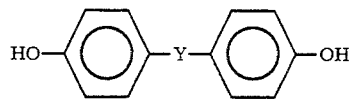

wherein Y is selected from the group consisting of C(CH₃)₂, SO₂, and S, and
      (c₂) a mixture of hydroquinone(HQ) and resorcinol(RC) with a mixing molar ratio of 1:0 to 1:1, and comprising 50 molar percent of the total ingredients.

2. A method of preparing said polyester-imide as defined in claim 1, which comprises:
   (a) mixing the aromatic diacid and the diimide diacid according to claim 1; and
   (b) condensation polymerizing the mixed diacid an equal molar amount of said diol as defined in claim 1.

3. A polyester-imide according to claim 1 wherein
   (a) is isophthalic acid,
   (b) is (b₂), and
   (c) is bisphenol A.

4. A polyester-imide according to claim 1 wherein
   (a) is terephthalic acid,
   (b) is (b₃), and
   (c) is (c₂) with a mixing molar ratio of 1:1.

5. A polyester-imide according to claim 1 wherein
   (a) is terephthalic acid,
   (b) is (b₁), and
   (c) is bisphenol A.

6. A polyester-imide as defined in claim 1 consisting essentially of about 0.5 moles of N-(m-carboxyphenyl) trimellitimide, about 0.5 moles of terephthalic acid or isphthalic acid about 1 mole of bisphenol A or a mixture of hydroquinone and resorcinol.

7. A polyester-imide as defined in claim 1 consisting of about 1 mole of N-(m-carboxyphenyl) trimellitimide or N-(p-carboxyphenyl) trimellitimide and about 1 mole of bisphenol A or a mixture of hydroquinone and resorcinol.

8. An amide and phenol series solvents soluble polyester-imide, having a carboxy to hydroxy equivalent molar ratio of 0.9:1 to 1.1:1 produced from and consisting of:

(a) aromatic diacid selected from the group consisting of
- ($a_1$) terephthalic acid(TPA),
- ($a_2$) isophthalic acid(IPA), and mixture thereof, and having a ratio of TPA:IPA of 1:0 to 0:1 and comprising 0–49 molar percent of the total ingredients;

(b) an imide diacid selected from the group consisting of
- ($b_1$) a diimide diacid having the formula as follows:

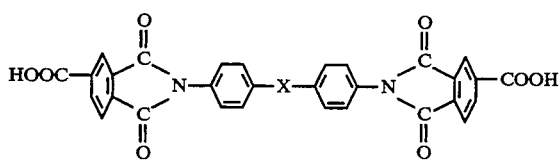

wherein x is selected from the group consisting of O, S, $SO_2$, CO, and $CH_2$, ($b_2$) a monoimide having the formula as follows:

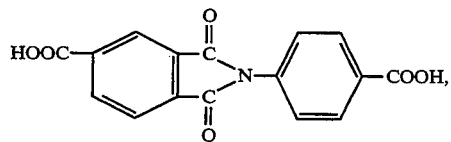

and ($b_3$) a monoimide having the formula as follows:

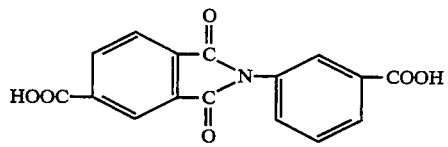

and mixtures thereof, and comprising 1–50 molar percent of the total ingredients; and (c) aryl diol selected from the group consisting of
($c_1$) having the formula as follows:

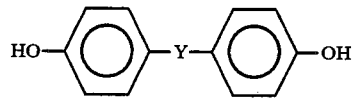

wherein Y is selected from the group consisting of $C(CH_3)_2$, $SO_2$, and S, and ($c_2$) a mixture of hydroquinone(HQ) and resorcinol(RC) with a mixing molar ratio of 1:0 to 1:1, and comprising 50 molar percent of the total ingredients.

* * * * *

UNITED STATES PATENT AND TRADEMARK OFFICE
CERTIFICATE OF CORRECTION

PATENT NO. : 5,349,039
DATED : September 20, 1994
INVENTOR(S) : Chien-Hui Li, et al.

It is certified that error appears in the above-indentified patent and that said Letters Patent is hereby corrected as shown below:

ON THE TITLE PAGE:

Item [73], Assignee should read --Industrial Technology Research Institute Chutung [Japan] --Taiwan, R.O.C.--.

Signed and Sealed this

Eleventh Day of April, 1995

Attest:

BRUCE LEHMAN

*Attesting Officer*     *Commissioner of Patents and Trademarks*